US008699067B2

(12) United States Patent
Ono

(10) Patent No.: US 8,699,067 B2
(45) Date of Patent: Apr. 15, 2014

(54) PULL PRINTING SYSTEM, METHOD AND COMPUTER-READABLE STORAGE MEDIUM FOR PROCESSING PRINT JOBS AFTER PULL PRINTING SERVER FAILURE

(75) Inventor: Tomomi Ono, Akashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 150 days.

(21) Appl. No.: 13/229,151

(22) Filed: Sep. 9, 2011

(65) Prior Publication Data

US 2012/0069394 A1   Mar. 22, 2012

(30) Foreign Application Priority Data

Sep. 16, 2010   (JP) .................................. 2010-208049

(51) Int. Cl.
G06F 3/12   (2006.01)
H04N 1/00   (2006.01)

(52) U.S. Cl.
USPC ........................................ 358/1.15; 358/1.13

(58) Field of Classification Search
USPC ............... 358/1.1, 1.9, 1.12, 1.13, 1.14, 1.15, 358/1.16; 709/203, 213, 220, 223
See application file for complete search history.

(56) References Cited

U.S. PATENT DOCUMENTS 6,791,703 B1 *   9/2004   Maeda et al. ................. 358/1.15
7,460,265 B2 *   12/2008   Keeney et al. ............... 358/1.15
2004/0193748 A1   9/2004   Sugimoto
2005/0237565 A1   10/2005   Maeda
2009/0284785 A1 *   11/2009   Bando .......................... 358/1.15
2011/0176163 A1 *   7/2011   Towata ........................ 358/1.15

FOREIGN PATENT DOCUMENTS

| JP | 9-191391 A | 7/1997 |
|---|---|---|
| JP | 11-154063 | 6/1999 |
| JP | 2001-024837 A | 1/2001 |
| JP | 2004-302562 A | 10/2004 |
| JP | 2004-310516 | 11/2004 |
| JP | 2005-309982 A | 11/2005 |
| JP | 2007-065706 A | 3/2007 |

OTHER PUBLICATIONS

Decision by the Japanese Patent Office to Grant a Patent in Japanese Patent Application No. 2010-208049 dated Sep. 18, 2012 and an English translation of the Decision (3 pages).

* cited by examiner

*Primary Examiner* — Gabriel Garcia
(74) *Attorney, Agent, or Firm* — Buchanan Ingersoll & Rooney PC

(57) ABSTRACT

In a pull printing system, a plurality of information devices configured to create print jobs individually, a pull printing server, and a plurality of image forming apparatuses are connected to one another via a network. Each of the information devices acquires, from the pull printing server, port information used for communication with the image forming apparatuses, stores the port information therein. If the pull printing server can perform communication with the subject information device at a time point when the port information is stored and onward, each of the information devices sends a print job created after the time point to the pull printing server. Otherwise, each of the information devices sends the print job to any one of the image forming apparatuses based on the port information.

11 Claims, 20 Drawing Sheets

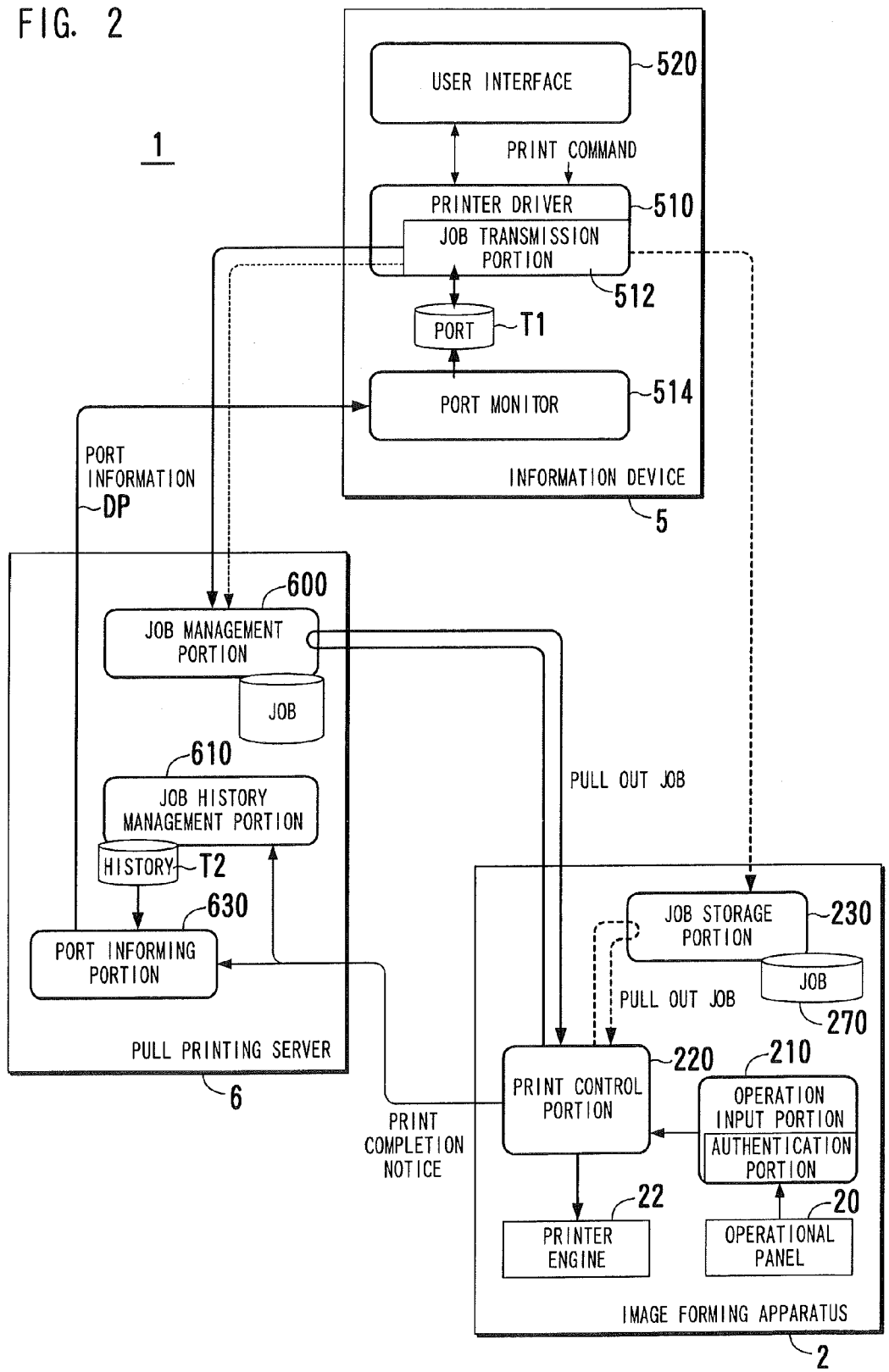

FIG. 10

| | ORDINAL RANK | DEVICE NAME | IP ADDRESS |
|---|---|---|---|
| T1 | 1 | MFP-1 | 192.168.0.5 |
| | 2 | MFP-2 | 192.168.0.6 |
| | 3 | MFP-3 | 192.168.1.5 |
| | 4 | MFP-4 | 10.128.0.5 |
| | 5 | - | - |

DP

| D2 | DEVICE USED THE LAST TIME | DATE OF THE LAST USE |
|---|---|---|
| | MFP-1 | 2010/7/10 |

FIG. 12

| T2 | USER NAME | JOB NAME | DATE | START TIME | END TIME | DEVICE NAME |
|---|---|---|---|---|---|---|
| 1 | Suzuki | Job-1 | 2010/7/15 | 9:00 | 9:01 | MFP-2 |
| 2 | Suzuki | Job-2 | 2010/7/15 | 9:30 | 9:32 | MFP-2 |
| 3 | Suzuki | Job-3 | 2010/7/15 | 13:20 | 13:21 | MFP-1 |
| 4 | Suzuki | Job-4 | 2010/7/15 | 13:40 | 13:41 | MFP-1 |
| 5 | Suzuki | Job-5 | 2010/7/16 | 8:30 | 8:31 | MFP-2 |
| 6 | Suzuki | Job-6 | 2010/7/16 | 8:40 | 8:41 | MFP-2 |
| 7 | Suzuki | Job-7 | 2010/7/16 | 10:00 | 10:01 | MFP-2 |
| 8 | Suzuki | Job-8 | 2010/7/16 | 18:00 | 18:01 | MFP-2 |
| 9 | Suzuki | Job-9 | 2010/7/17 | 11:00 | 11:03 | MFP-3 |
| 10 | Suzuki | Job-10 | 2010/7/17 | 11:30 | 11:33 | MFP-3 |
| 11 | Suzuki | Job-11 | 2010/7/17 | 14:50 | 14:52 | MFP-3 |
| 12 | Suzuki | Job-12 | 2010/7/18 | 11:00 | 11:01 | MFP-2 |
| 13 | Suzuki | Job-13 | 2010/7/18 | 15:00 | 15:01 | MFP-2 |
| 14 | Suzuki | Job-14 | 2010/7/18 | 17:00 | 17:01 | MFP-2 |
| 15 | - | - | - | - | - | - |

FIG. 13

| | ORDINAL RANK | DEVICE NAME | IP ADDRESS |
|---|---|---|---|
| T1a | 1 | MFP-2 | 192.168.0.6 |
| | 2 | MFP-3 | 192.168.1.5 |
| | 3 | MFP-1 | 192.168.0.5 |
| | 4 | MFP-4 | 10.128.0.5 |

DPa

| | DEVICE USED THE LAST TIME | DATE OF THE LAST USE |
|---|---|---|
| D2a | MFP-2 | 2010/7/18 |

FIG. 15

| | | USER NAME | JOB NAME | DATE | START TIME | END TIME | DEVICE NAME |
|---|---|---|---|---|---|---|---|
| T2b | 1 | Suzuki | Job-1 | 2010/7/15 | 9:00 | 9:01 | MFP-2 |
| | 2 | Suzuki | Job-2 | 2010/7/15 | 9:30 | 9:32 | MFP-2 |
| | 3 | Suzuki | Job-3 | 2010/7/15 | 13:20 | 13:21 | MFP-1 |
| | 4 | Suzuki | Job-4 | 2010/7/15 | 13:40 | 13:41 | MFP-1 |
| | 5 | Suzuki | Job-5 | 2010/7/16 | 8:30 | 8:31 | MFP-2 |
| | 6 | Suzuki | Job-6 | 2010/7/16 | 8:40 | 8:41 | MFP-2 |
| | 7 | Suzuki | Job-7 | 2010/7/16 | 10:00 | 10:01 | MFP-2 |
| | 8 | Suzuki | Job-8 | 2010/7/16 | 18:00 | 18:01 | MFP-2 |
| | 9 | Suzuki | Job-9 | 2010/7/17 | 11:00 | 11:03 | MFP-3 |
| | 10 | Suzuki | Job-10 | 2010/7/17 | 11:30 | 11:33 | MFP-3 |
| | 11 | Suzuki | Job-11 | 2010/7/17 | 14:50 | 14:52 | MFP-3 |
| | 12 | Suzuki | Job-12 | 2010/7/18 | 11:00 | 11:01 | MFP-2 |
| | 13 | Suzuki | Job-13 | 2010/7/18 | 15:00 | 15:01 | MFP-2 |
| | 14 | Suzuki | Job-14 | 2010/7/18 | 17:00 | 17:01 | MFP-2 |
| | 15 | Suzuki | Job-15 | 2010/7/20 | 16:00 | 16:01 | MFP-4 |

FIG. 16

| ORDINAL RANK | DEVICE NAME | IP ADDRESS |
|---|---|---|
| 1 | MFP-2 | 192.168.0.6 |
| 2 | MFP-3 | 192.168.1.5 |
| 3 | MFP-1 | 192.168.0.5 |
| 4 | MFP-4 | 10.128.0.5 |

| DEVICE USED THE LAST TIME | DATE OF THE LAST USE |
|---|---|
| MFP-4 | 2010/7/20 |

PULL PRINTING SYSTEM, METHOD AND COMPUTER-READABLE STORAGE MEDIUM FOR PROCESSING PRINT JOBS AFTER PULL PRINTING SERVER FAILURE

This application is based on Japanese patent application No. 2010-208049 filed on Sep. 16, 2010, the contents of which are hereby incorporated by reference.

BACKGROUND OF THE INVENTION

1. Field of the Invention

The present invention relates to a pull printing system, a method for processing print jobs in the pull printing system, a pull printing server, and a computer-readable storage medium for computer program used in the pull printing system.

2. Description of the Related Art

Network printing has attained widespread use in which print jobs are provided to an image forming apparatus such as a printer or a Multi-Functional Peripheral (MFP) via a network. A print job is a print instruction containing information to be printed, and print setting information, e.g., the set of prints, paper size, single-sided/double-sided, monochrome/color, and finishing option. An image forming apparatus executes such a print job.

An example of the network printing is "pull printing" suitable for a network in which a plurality of image forming apparatuses are connected to one another. According to the pull printing, a print job is temporarily stored in a pull printing server, and such a print job is executed (printing is performed) at a time different from a time at which the print job is created (issued). For example, when a user of a personal computer gives a command to print a document, a print job created in the personal computer is transmitted to a pull printing server and is stored therein. Subsequently, the user goes to the site of an image forming apparatus arbitrarily selected by him/her from among a plurality of image forming apparatuses, and instructs the selected image forming apparatus to execute the print job. In response to the instructions, the image forming apparatus pulls the print job out of the pull printing server, and executes the print job. In the pull printing, a user can select an image forming apparatus installed at a place convenient for him/her from among image forming apparatuses installed at places away from one another. Further, in the pull printing, when users share image forming apparatuses installed adjacent to one another, each of the users can select an available image forming apparatus not used by the other users, and use the selected image forming apparatus. In short, the pull printing can provide a just-in-time printing environment.

As for the network printing, a device is disclosed which automatically changes settings for a printer port of a computer from which a print job is issued (see Japanese Laid-open Patent Publication No. 2005-309982). According to the port setting changing device disclosed in the publication, when a printer (previously-used printer) connected to a network is replaced with another printer, a job issued to the previously-used printer is monitored, and port settings for a computer from which the job is issued are changed. This saves a user from having to manually change port settings based on which a transmission destination of a print job in the computer is determined.

In a conventional network printing environment for pull printing, an address of an image forming apparatus executing a print job is registered only in a pull printing server, but is not registered in an information device (typically, a personal computer) functioning as the job issuer to create the print job. Stated differently, the pull printing server is specified as a printer port of the information device that is the job issuer, and a transmission destination of a print job is limited to the pull printing server. Suppose that, in such a case, the pull printing server is brought to a standstill due to some reasons, e.g., for maintenance of the pull printing server or network connection problem. This makes it impossible for the image forming apparatus to perform a printing process, and also impossible for the information device to send a print job.

In order to avoid such a situation, it may be conceived that the information device directly transmits a print job to the image forming apparatus. The following two methods are possible to transmit a print job directly to the image forming apparatus. The first method is applied to a case where a device driver for pull printing server is compliant with the image forming apparatus. The first method is to change a printer port registered in the device driver from the address of the pull printing server to the address of the image forming apparatus. The use of the first method, however, requires a user of the information device to obtain the address of the image forming apparatus, for example, by asking a system administrator about the address thereof. Thus, the user cannot instruct the image forming apparatus to perform a printing process immediately after knowing that the pull printing server halts. As for the second method, a device driver dedicated for image forming apparatus is installed onto the information device in advance. If a print job cannot be transmitted to the pull printing server, then the user manually changes the printer port. According to the second method, a device driver needs to be installed onto the information device in advance, and a user is forced to perform operation for changing the printer port manually.

The operation for changing the printer port manually can be eliminated by using the conventional technique described in Japanese Laid-open Patent Publication No. 2005-309982 to incorporate the port setting changing device described therein into a network. However, this approach needs to install new hardware for monitoring packets flowing through the network, which in turn needs to provide room to install the hardware and to install the necessary wiring.

SUMMARY

The present disclosure is directed to solve the problems pointed out above, and therefore, an object of an embodiment of the present invention is to provide a pull printing environment where a printing process can be performed even when a pull printing server halts, without connecting a new specific device to a network.

According to an aspect of the present invention, a pull printing system includes a plurality of information devices configured to create print jobs individually, a pull printing server that stores, therein, at least one of print jobs created by any one of the information devices, a plurality of image forming apparatuses configured to acquire, from the pull printing server, a print job stored in the pull printing server and to execute the print job thus acquired. The information devices, the pull printing server, and the image forming apparatuses are connected to one another via a network. Each of the information devices includes a port management portion that acquires, from the pull printing server, port information used for communication with the image forming apparatuses, and stores the port information therein, and a job transmission portion that, if the pull printing server can perform communication with the subject information device at a time point when the port information is stored and onward, sends a print job created after the time point to the pull printing server, and, if the pull printing server cannot perform communication with the subject information device at the time point and onward, sends said print job to any one of the image forming apparatuses based on the port information. The pull printing server includes a port notifying portion that sends the port information to the subject information device.

These and other characteristics and objects of the present invention will become more apparent by the following descriptions of preferred embodiments with reference to drawings.

BRIEF DESCRIPTION OF THE DRAWINGS

FIG. 2 is a block diagram showing an example of the functional configuration of an information device, a pull printing server, and an image forming apparatus in a pull printing system.

FIG. 10 is a diagram showing an example of the details of port information.

FIG. 12 is a diagram showing an example of the details of a history table.

FIG. 13 is a diagram showing an example of the details of port information corresponding to the example of FIG. 12.

FIG. 15 is a diagram showing another example of the details of a history table.

FIG. 16 is a diagram showing an example of the details of port information corresponding to the example of FIG. 15.

DESCRIPTION OF THE PREFERRED EMBODIMENTS

The following description takes, as an embodiment of the present invention, a pull printing system to send and receive print jobs using a Local Area Network (LAN) or a Wide Area Network (WAN) installed in offices of business or offices of organizations similar thereto. A plurality of users (operators) use the pull printing system. With the pull printing system, a print job contains identification information for identifying a user, and only a user who has been authenticated by the pull printing system is allowed to cause an image forming apparatus to perform a printing process.

Figure 1A:
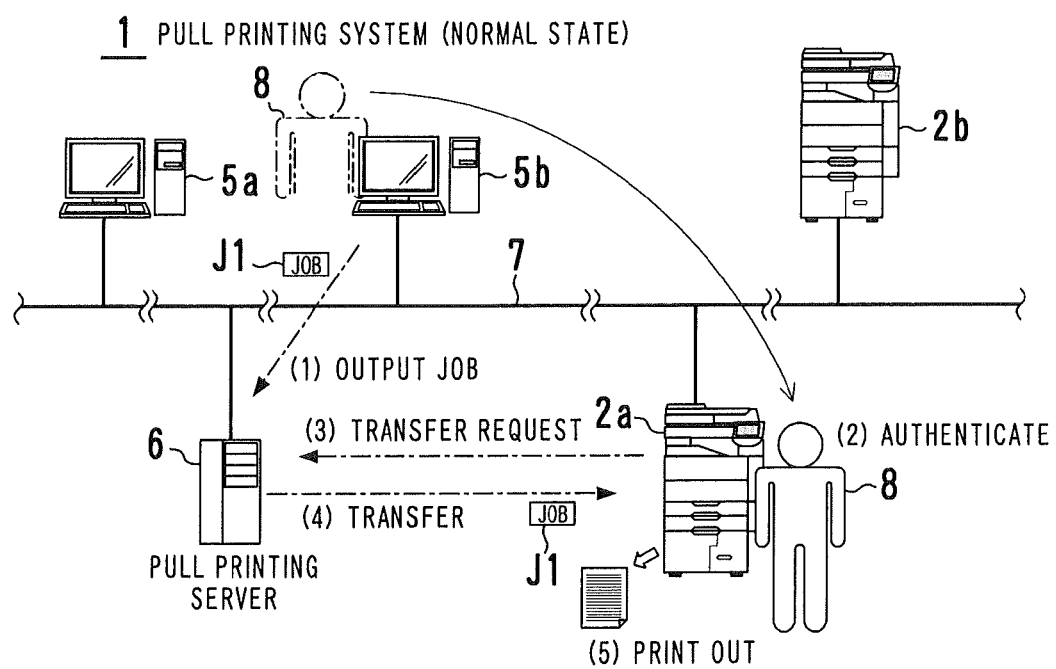
FIGS. 1A and 1B are schematic diagrams showing examples of the configuration and functions of a pull printing system according to an embodiment of the present invention.
Figure 1B:
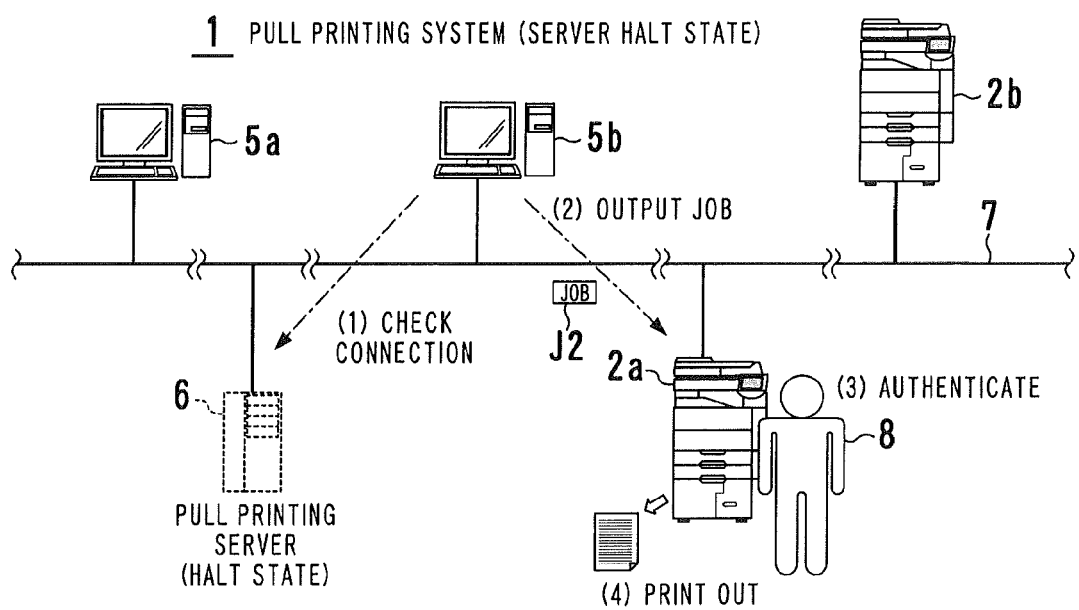

Referring to FIGS. 1A and 1B, the pull printing system 1 includes a plurality of information devices 5a and 5b, a pull printing server 6, and a plurality of image forming apparatuses 2a and 2b. All of the devices are connected to one another via a network 7, which enables mutual communication therebetween. The network 7 may be any one of a wired network, a wireless network, and a network provided by combining a wired network and a wireless network.

Each of the information devices 5a and 5b has a function to create a print job with a predetermined format. An application for creating or editing a document to be printed, and a printer driver for creating a print job by adding print setting information to document data that indicates the details of a document to be printed are installed onto each of the information devices 5a and 5b. Each of the information devices 5a and 5b is provided with a display and an operation input device by means of which a user makes settings for printing. A created print job is spooled in some cases. However, as soon as being created, the print job is ordinarily transmitted to a predetermined job-receiving device (usually, a pull printing server 6). Basically, print jobs are not stored in the information devices 5a and 5b. Examples of the information devices 5a and 5b are a personal computer (PC), a Personal Digital Assistant (PDA), and a various types of mobile information terminals. All of the information devices 5a and 5b may be or may not be the same in kind.

The pull printing server 6 stores, thereinto, one or more print jobs created by the information devices 5a and 5b. The pull printing server 6 may be or may not be a dedicated server. For example, server software is incorporated into a personal computer, and the resultant may be used as the pull printing server 6.

Each of the image forming apparatuses 2a and 2b executes a print job and outputs a printed matter. An MFP, also called a multifunction device, is suitable as each of the image forming apparatuses 2a and 2b. This is because a recent MFP usually has a function to store print jobs therein and to manage the print jobs in such a manner that the print jobs can be executed at an appropriate timing. Such a function is useful to perform pull printing during a period of time when the pull printing server 6 is at a standstill. However, if a printer has a pull function to acquire a print job from the pull printing server 6 in accordance with operation by a user, such a printer that obtains a print job from the pull printing server 6 or the information devices 5a and 5b and promptly executes the print job can be used as the image forming apparatus 2a or 2b.

In the illustrated example, two information devices 5a and 5b, and two image forming apparatuses 2a and 2b are provided in the pull printing system 1. The present invention, however, is not limited thereto. The number of information devices for creating print jobs and the number of image forming apparatuses for executing print jobs each may be any number as long as the number thereof is at least one. In the following description, it is assumed that a plurality of image forming apparatuses (not shown) aside from the image forming apparatuses 2a and 2b are connected to the network 7.

FIG. 1A shows an example of the flow of a process for executing a print job under a normal state in which the pull printing server 6 operates normally. In the illustrated example, the information device 5b operated by a user 8 creates a print job J1. The flow of a printing process after the print job J1 is created is as follows:

(1) The information device 5b establishes a connection with the pull printing sever 6, and transmits the print job J1 thereto. The pull printing server 6 stores the print job J1 thereinto.

(2) The user 8 uses, for example, the image forming apparatus 2a to perform operation for authentication. The authentication may be performed by known methods, e.g., by entering an ID or password with keys, reading authentication information out of an IC card or other media, and using biometric authentication techniques.

(3) In accordance with instruction operation by the user 8, the image forming apparatus 2a requests the pull printing server 6 to transfer the print job J1 thereto. In short, the image forming apparatus 2a performs a pull process for drawing a job from the pull printing server 6.

(4) The pull printing server 6 transfers the print job J1 to the image forming apparatus 2a.

(5) The image forming apparatus 2a executes the print job J1 to output a printed matter.

The user 8 can arbitrarily determine which of the image forming apparatuses including the image forming apparatuses 2a and 2b and other image forming apparatuses (not shown) is used to print a document based on the print job J1. This is not limited to a print job created by the information device 5b and is similarly applied to a print job created by the information device 5a.

FIG. 1B shows an example of the flow of a process for executing a print job under a state in which the pull printing server 6 halts due to maintenance thereof or some other reasons. Such a state is hereinafter referred to as a "server halt state". In the illustrated example, the information device 5b creates a print job J2. The flow of a printing process after the print job J2 is created is as follows:

(1) The information device 5b attempts to perform communication with the pull printing sever 6. However, no response is received from the pull printing server 6, so, the information device 5b determines that the pull printing sever 6 halts.

(2) The information device 5b establishes a connection to perform communication with, for example, the image forming apparatus 2a, and transmits the print job J2 thereto. Note that, in this embodiment, the image forming apparatus 2a stores, therein, the print job J2 with the print job J2 left unexecuted. When transmitting the print job J2, the information device 5b may automatically select the transmission destination of the printing job J2 from among the image forming apparatuses 2a and 2b, or, the user 8 may select the transmission destination of the printing job J2. In the case of the automatic selection, the information device 5b displays a message such as "the job has been sent directly to "MFP-1" rather than the pull printing server 6" to indicate the transmission destination of the job.

(3) The user 8 uses the image forming apparatus 2a in which the print job J2 is stored to perform operation for authentication.

(4) In accordance with instruction operation by the user 8, the image forming apparatus 2a executes the print job J2 to output a printed matter.

As discussed above, the transmission destination of the print job J2 is switched from the pull printing server 6 to any one of the image forming apparatuses 2a and 2b. This enables a user of the pull printing system 1 to print a document created in the information device 5a or 5b even when the pull printing server 6 stops for some reasons. On the other hand, suppose that the transmission destination of the print job J2 is not switched from the pull printing server 6. In such a case, the print job J2 is not transmitted appropriately during a period of time when the pull printing server 6 halts. The user, therefore, has to operate the information device 5a or 5b to cancel transmission of the print job J2, wait for the pull printing server 6 to operate again, and then to create a print job J2 once again.

In the case of the direct transmission of the print job J2 from the information device 5a or 5b to the image forming apparatus 2a or 2b, the transmission destination of the print job J2 is determined to offer convenience to the user 8 and other users. This makes the pull printing system 1 convenient to use. An example of the transmission destination convenient for users is generally an image forming apparatus most frequently used by each of the users. In view of this, according to the pull printing system 1, the pull printing server 6 has a function to manage a print job execution history, and also, sends, to each of the information devices 5a and 5b, port information indicating which image forming apparatus is frequently used. The port information is updated at an appropriate timing. Under the server halt state, each of the information devices 5a and 5b refers to the updated port information saved in advance, and determines a transmission destination.

Detailed descriptions are provided below of the configuration and operation of the pull printing system 1. In the descriptions, unless it is necessary to distinguish the information devices 5a and 5b from each other, one device appropriately selected therefrom is referred to as an "information device 5". Likewise, unless it is necessary to distinguish the plurality of image forming apparatuses including the image forming apparatuses 2a and 2b from one another, one apparatus appropriately selected therefrom is referred to as an "image forming apparatus 2". Based on this rule, elements and parts in the drawings are given reference signs.

FIG. 2 shows an example of the functional configuration of the information device 5, the pull printing server 6, and the image forming apparatus 2. The information devices 5a and 5b have the same function as each other; however, they do not necessarily have the same hardware configuration as each other. Likewise, the image forming apparatuses 2a and 2b should have the same function as each other; however, they may or may not have the same hardware configuration as each other.

[Configuration of Information Device]

The information device 5 is configured of a printer driver 510 containing a job transmission portion 512 therein, a port monitor 514, a user interface 520, and so on. A Central Processing Unit (CPU), which is incorporated as a computer to execute programs into the information device 5, executes programs for printing control, and thereby, functions of the elements of the information device 5 are implemented.

The printer driver 510 works in cooperation with an operating system (not shown), receives document data from an application, and then creates a print job. Immediately after that, the job transmission portion 512 transmits the print job to the pull printing server 6 or the image forming apparatus 2.

The port monitor 514 functions as a port management portion that obtains port information DP from the pull printing server 6 and saves the port information DP. The port information DP contains an address necessary to perform communication with the image forming apparatus 2. The port information DP is transmitted from the pull printing server 6 to the information device 5 when the image forming apparatus 2 executes a print job created by the information device 5. The port monitor 514 writes the port information DP onto a port table T1 provided in a non-volatile memory.

The job transmission portion 512 of the printer driver 510 changes a transmission destination of a print job depending on the state of the pull printing server 6. If the job transmission portion 512 can perform communication with the pull printing server 6 at a time point when the port information DP is stored and beyond, then the job transmission portion 512 transmits a print job created at the time point and beyond to the pull printing server 6 as shown in the solid-line arrow of FIG. 2. Otherwise, the job transmission portion 512 determines a transmission destination of a print job by referring to the port information in the port table T1, and transmits the print job to the image forming apparatus 2 as the transmission destination based on an address contained in the port information (see the broken-line arrow of FIG. 2).

The user interface 520 provides an operational environment in which the user specifies where a print job is to be transmitted to during a period of time when the pull printing server 6 stops. The user interface 520 serves to display a printer port setting window described later, and notify the job transmission portion 512 of the transmission destination specified by the user. The details specified by the user are reflected at the time of changing the transmission destination by the job transmission portion 512.

[Server Configuration]

The pull printing server 6 is configured of a job management portion 600, a job history management portion 610, a port informing portion 630, and so on. A CPU, which is incorporated as a computer to execute programs into the pull printing server 6, executes control programs, and thereby, functions of the individual portions of the pull printing server 6 are implemented.

The job management portion 600 performs the basic process as a server for pull printing. The job management portion 600 receives a print job transmitted from the information device 5, and stores the print job thereinto. The job management portion 600 also responds to an inquiry from the image forming apparatus 2 as to whether there is a print job or not, and responds to a print job transfer request from the image forming apparatus 2.

The job history management portion 610 records a print job execution history of print jobs that are transferred by the job management portion 600 to the image forming apparatus 2 and are executed by the image forming apparatus 2. Upon receiving a printing completion notice from the image forming apparatus 2, the job history management portion 610 writes, into a history table T2, data indicating the job name, identification information of the image forming apparatus, and the date and time at which the job was executed. Every time a print completion notice is received, the details of the history table T2 are updated so as to add new data.

The port informing portion 630 transmits the port information DP to the information device 5. As described above, the port information DP contains an address of the image forming apparatus 2 which is necessary for the information device 5 to transmit a print job directly to the image forming apparatus 2. The port informing portion 630 transmits the port information DP at a time when a print completion notice is received from the image forming apparatus 2. The information device 5, which is the transmission destination of the port information DP, is information device 5 used by the user who has given a command to create a print job corresponding to the print completion notice.

The port information DP according to this embodiment indicates addresses of image forming apparatuses including the image forming apparatus 2 which has executed the print job, and the order of the image forming apparatuses. The order of the image forming apparatuses is a priority order based on which a transmission destination of a print job is selected. The order of the image forming apparatuses is determined by the port informing portion 630 based on the history recorded in the history table T2. Unless the user specifies a transmission destination of a print job in the information device 5 under the pull printing server halt state, the printer driver 510 automatically selects a transmission destination based on the port information DP. A method for determining the order of the image forming apparatuses is described later.

[Configuration of Image Forming Apparatus]

The image forming apparatus 2 is configured of an operation input portion 210, a print control portion 220, a job storage portion 230, and so on. A CPU, which is incorporated as a computer to execute programs into the image forming apparatus 2, executes control programs, so that functions of the individual portions of the image forming apparatus 2 are implemented. The operation input portion 210 and the print control portion 220 are the basic elements of the image forming apparatus 2. The job storage portion 230 is an additional element for implementing pull printing under a server halt state.

The operation input portion 210 receives operation performed by a user thorough an operational panel 20. When the user performs operation for instructing the image forming apparatus 2 to print a document, the operation input portion 210 conveys the details of the instructions to the print control portion 220. The operation input portion 210 contains an authentication portion for performing a user authentication process.

The print control portion 220 receives a print job and controls a printer engine 22 functioning as a print mechanism. In usual cases, the print control portion 220 obtains a print job specified by a user operating the operation input portion 210 via the job management portion 600 of the pull printing server 6, and executes the obtained print job. After the printer engine 22 outputs printed paper, the print control portion 220 transmits a print completion notice to the pull printing server 6. In the case where a print job saved in a box 270 that is a memory area for accumulating a variety of types of data is specified in the operation input portion 210, the print control portion 220 obtains the specified print job through the job storage portion 230, and executes that print job.

The job storage portion 230 responds to an access from the job transmission portion 512 of the information device 5. When the job transmission portion 512 transmits a print job, the job storage portion 230 receives the print job and saves the same to the box 270. Thereafter, when receiving a request, from the print control portion 220, to read out a print job, the job storage portion 230 responds to the request, and conveys the print job requested to the print control portion 220.

Figure 3:
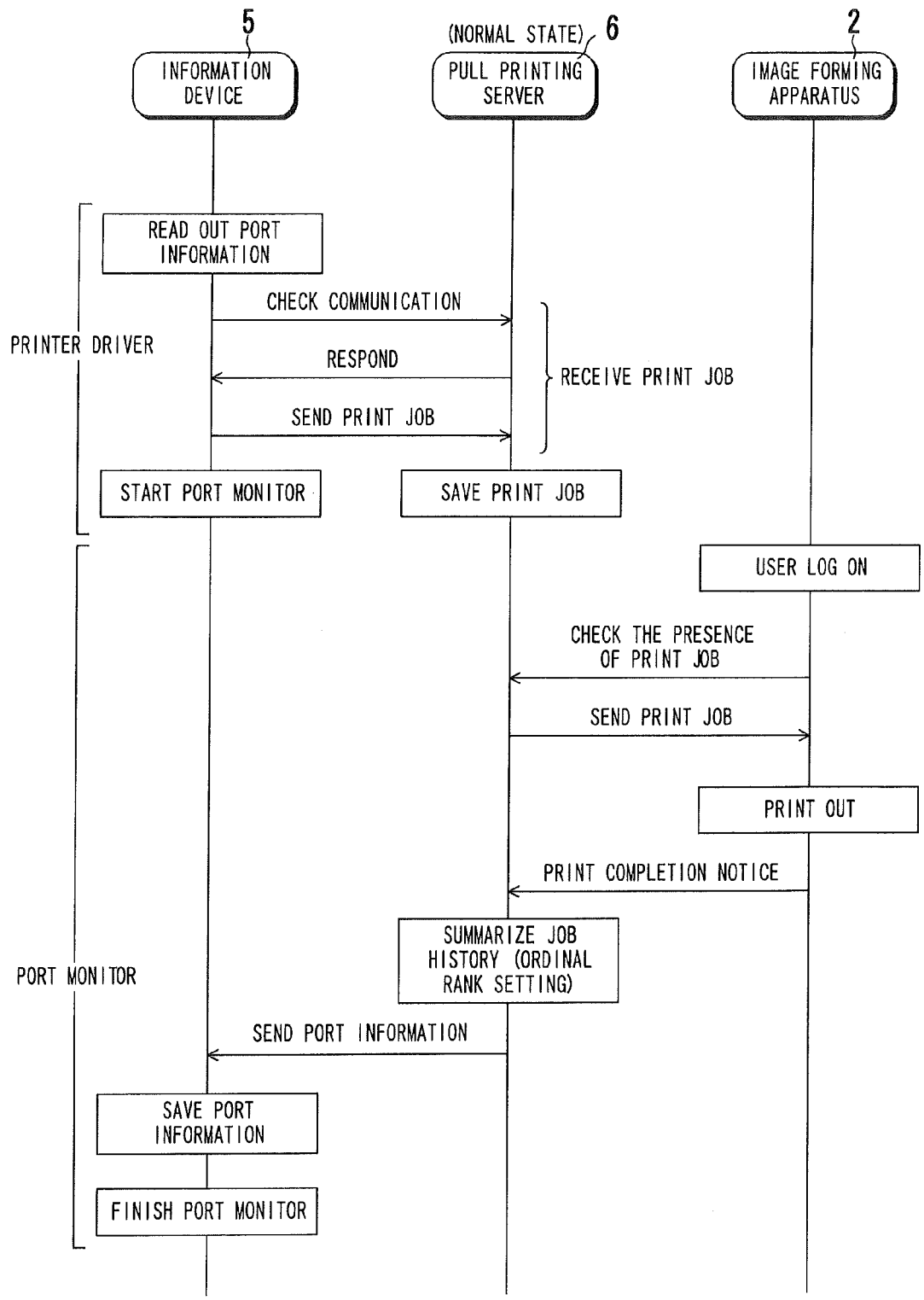
FIG. 3 is a diagram showing an example of a communication sequence in a pull printing system under a normal state in which a pull printing server operates.
Figure 4:
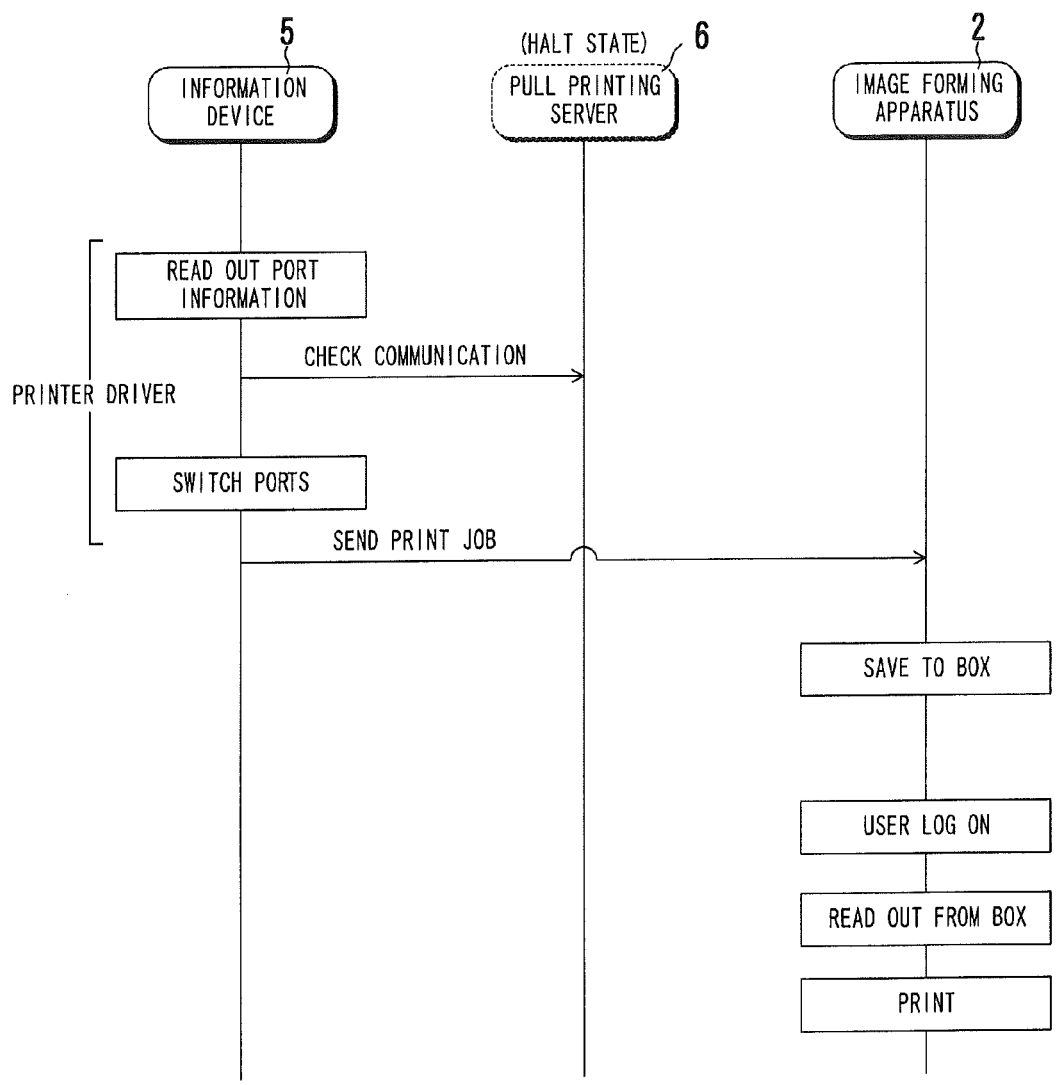
FIG. 4 is a diagram showing an example of a communication sequence in a pull printing system under a state in which a pull printing server halts.

FIGS. 3 and 4 show a communication sequence in the pull printing system 1 having the configuration discussed above.

First, the printer driver 510 (see FIG. 2) of the information device 5 imports port information thereinto to know the presence of an image forming apparatus, and confirms whether or not communication can be performed with the pull printing server 6 which is a predetermined printer port. In a normal state as shown in FIG. 3 where the pull printing server 6 operates, a connection between the information device 5 and the pull printing server 6 is established, which enables the information device 5 to transmit a print job to the pull printing server 6. The print job received by the pull printing server 6 is saved thereto. The printer driver 510 of the information device 5 puts the port monitor 514 in motion. In contrast, in a server halt state as shown in FIG. 4 where the pull printing server 6 does not operate, the pull printing server 6 does not respond to a request, sent from the information device 5, to check communication with the pull printing server 6. The printer driver 510 of the information device 5, therefore, switches the printer port from the pull printing server 6 to the image forming apparatus 2, and transmits a print job to the image forming apparatus 2. The print job received by the image forming apparatus 2 is saved to the box 270. Thereafter, when a user specifies a print job and gives a command to execute the print job, the print job thus specified is read out from the box 270, and is executed.

Referring back to FIG. 3, when a user who has logged onto the image forming apparatus 2 performs predetermined operation, a print job in the pull printing server 6 is transferred to the image forming apparatus 2 and executed thereby. Upon receiving a print completion notice from the image forming apparatus 2, the pull printing server 6 updates the print job execution history, and determines the order of the plurality of image forming apparatuses based on the updated history. The pull printing server 6 transmits, to the information device 5, port information indicating addresses of the plurality of image forming apparatuses and the order thereof. The port information received by the information device 5 is saved by the port monitor 514. Subsequently, when the pull printing server 6 stops, the printing port is changed to another port based on the port information.

Figure 5:
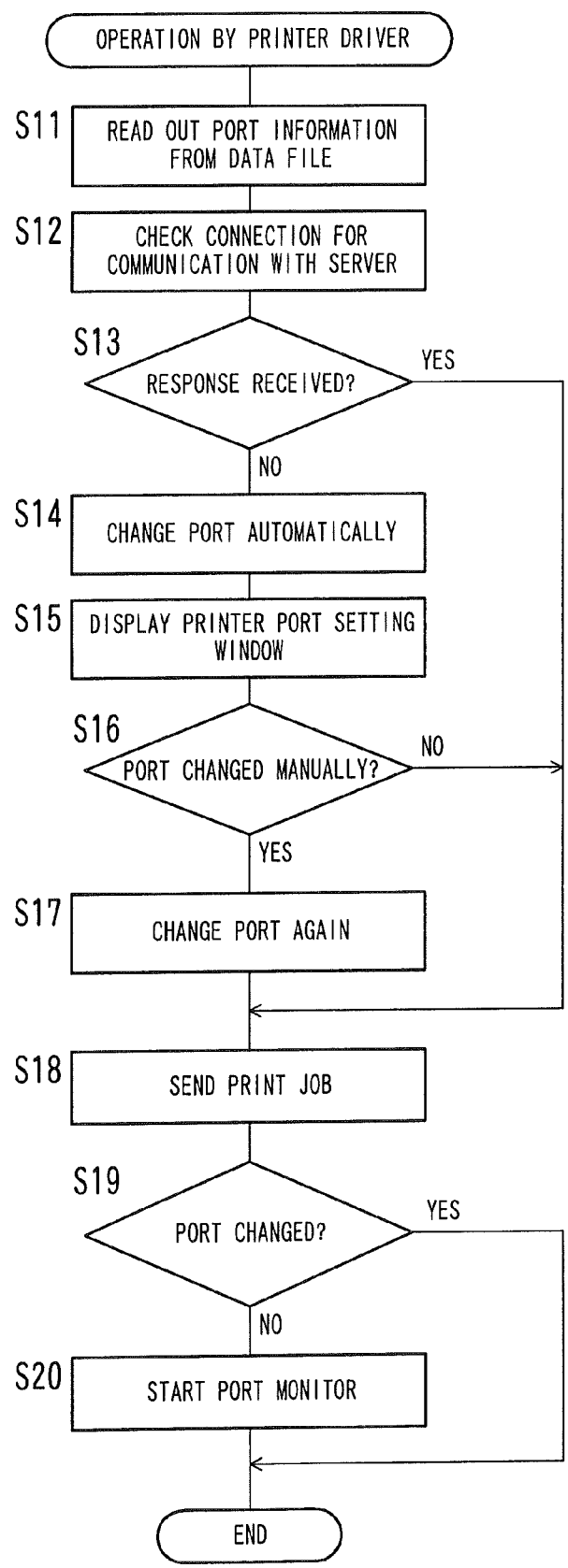
FIG. 5 is a flowchart depicting an example of the flow of operation performed by a printer driver of an information device.

FIG. 5 is a flowchart depicting an example of the flow of operation performed by the printer driver 510 of the information device 5. The printer driver 510 reads out port information from a predetermined saved data file (S11), sends, to the pull printing server 6, a command to confirm the connection therewith (S12), and checks whether or not a response from the pull printing server 6 is received (S13).

If receiving a response from the pull printing server 6 (Yes in S13), then the process goes to Step S18, and the printer driver 510 transmits a print job to a printer port currently specified. In this case, the print job is transmitted to the pull printing server 6 that is a specified printer port.

If receiving no response from the pull printing server 6 (No in S13), then the process goes to Step S14, and the printer driver 510 automatically switches the printer port from the pull printing server 6 to, for example, an image forming apparatus 2 indicated as the apparatus having the highest order in the port information. The printer driver 510, then, displays a printer port setting window (S15), and checks whether or not the user has given a command to change the printer port (S16). If such a command has been give by the user (Yes in S16), then the printer port is changed in accordance with the command, and then, the process goes to Step S18 in which the print job is transmitted. In this case, the print job is transmitted not to the pull printing server 6 but to the image forming apparatus 2.

If the printer driver 510 has transmitted the print job without changing the printer port (No in S19), or, in other words, if the printer driver 510 has transmitted the print job to the pull printing server 6, then the printer driver 510 puts the port monitor 514 in motion (S20).

Figure 6:
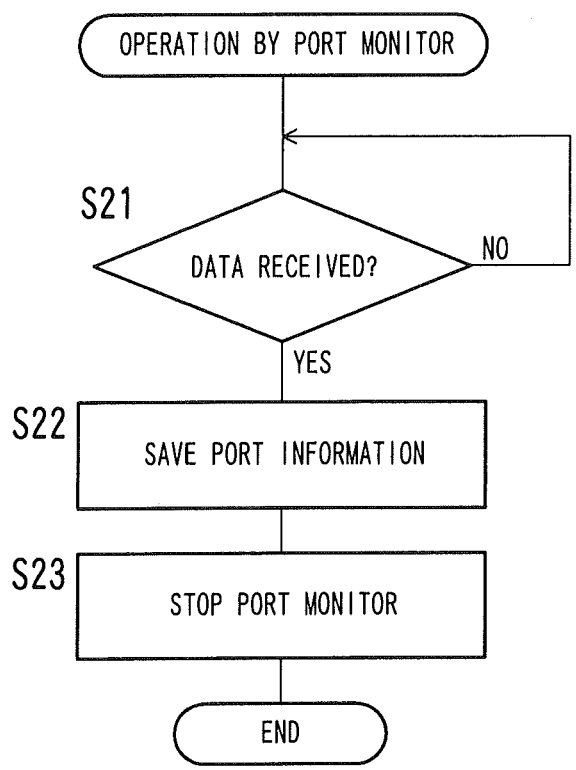
FIG. 6 is a flowchart depicting an example of the flow of operation performed by a port monitor of an information device.

FIG. 6 is a flowchart depicting an example of the flow of operation performed by the port monitor 514 of the information device 5. The port monitor 514 waits for data to be received from the pull printing server 6 (S21), saves, thereto, port information DP sent from the pull printing server 6 (S22), and finishes the operation (S23).

Figure 7:
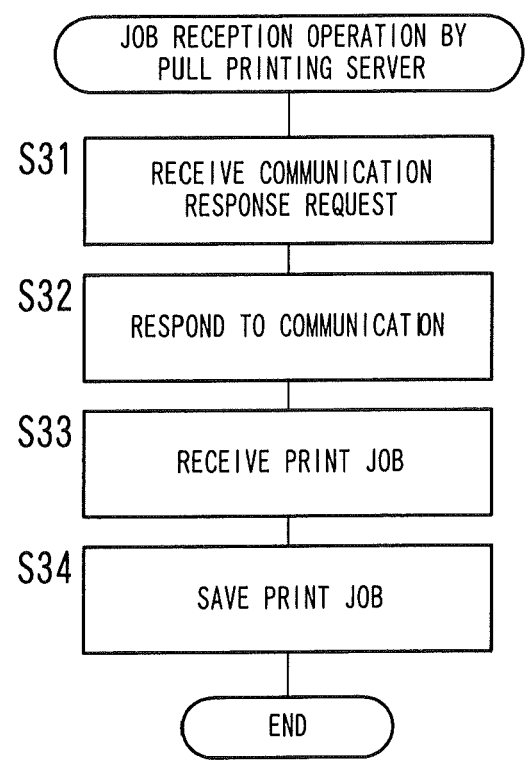
FIG. 7 is a flowchart depicting an example of the flow of a job reception process performed by a pull printing server.
Figure 8:
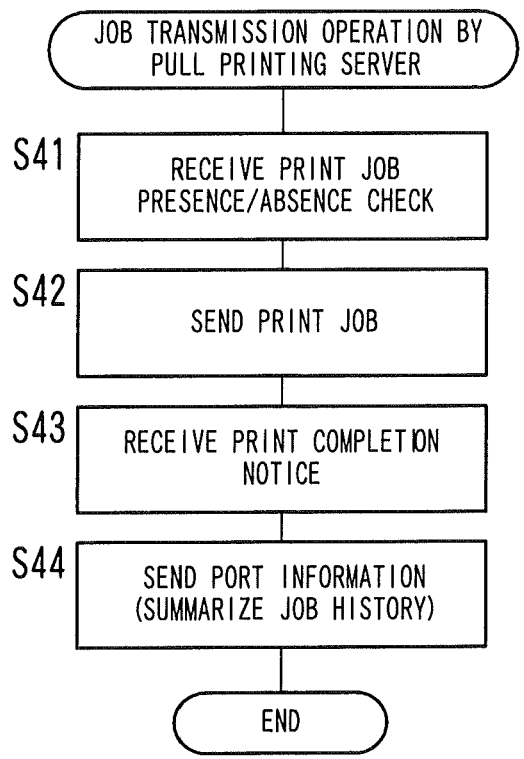
FIG. 8 is a flowchart depicting an example of the flow of a job transmission process performed by a pull printing server.

FIGS. 7 and 8 are flowcharts depicting an example of the flow of operation performed by the pull printing server 6.

Referring to FIG. 7, the job management portion 600 of the pull printing server 6 establishes a connection with the information device 5 in response to a communication response request in the form of connection confirmation command from the information device 5 (S31 and S32), and receives and saves a print job transmitted from the information device 5 (S33 and S34).

Referring to FIG. 8, the job management portion 600 of the pull printing server 6 transfers a print job to the image forming apparatus 2 in response to a job presence/absence check sent from the image forming apparatus 2, i.e., a transfer request (S41 and S42). Upon the receipt of a print completion notice from the image forming apparatus 2, the port informing portion 630 transmits port information DP to the information device 5 (S43 and S44). Prior to transmitting the port information. DP, the job history management portion 610 updates the history table T2, and the port informing portion 630 summarizes the updated history to determine the order of the image forming apparatuses.

Figure 9:
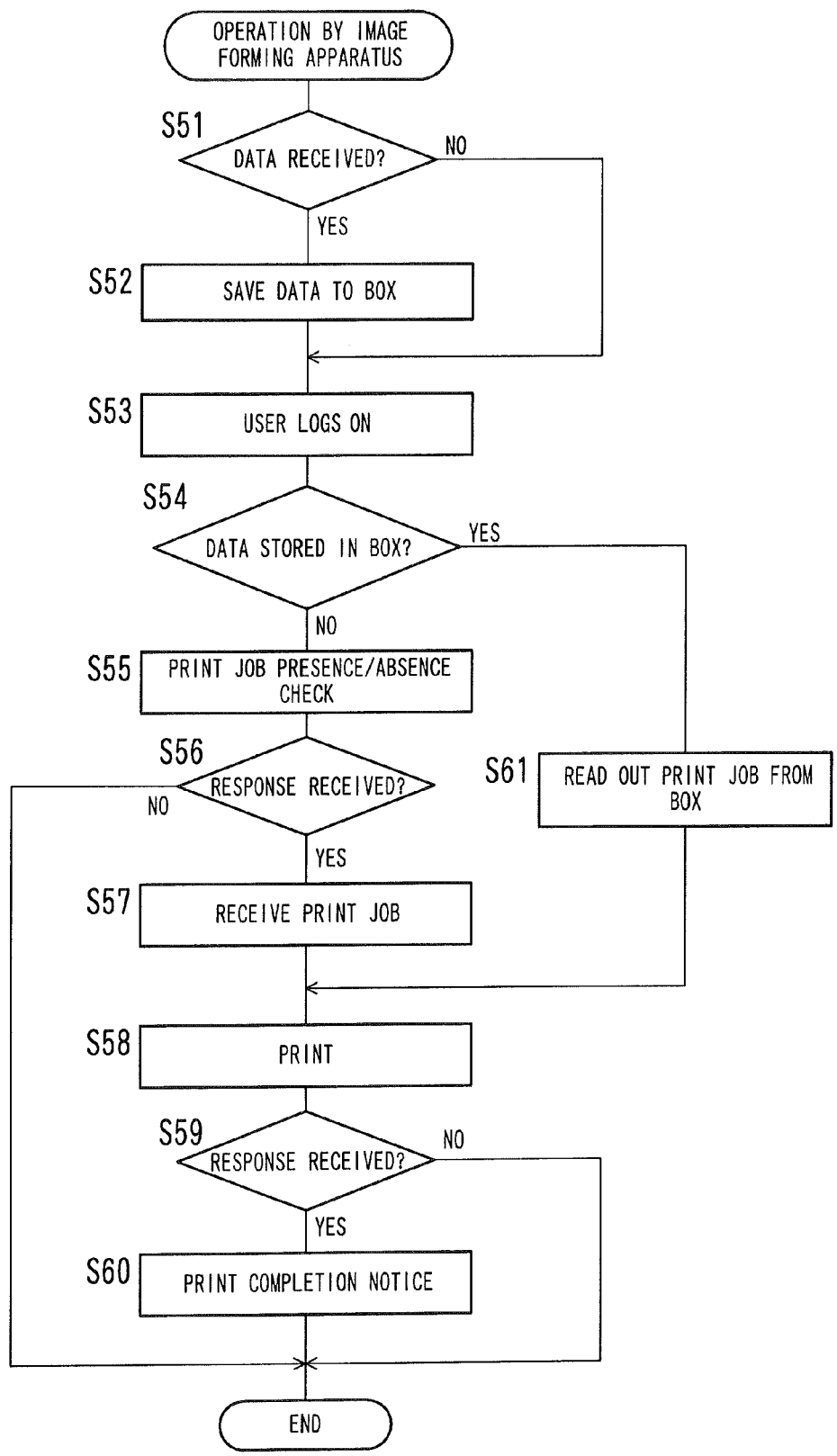
FIG. 9 is a flowchart depicting an example of the flow of operation performed by an image forming apparatus.

FIG. 9 is a flowchart depicting an example of the flow of operation performed by the image forming apparatus 2.

When the information device 5 transmits a print job, the job storage portion 230 of the image forming apparatus 2 receives the print job, and stores the same into the box 270 (S51 and S52).

The operation input portion 210 performs authentication process on a user who has performed predetermined log-on operation, and receives the succeeding operation/input performed by the user (S53). If there is a print job saved to the box 270 (Yes in S54), and if the user gives a command to execute the print job, then the print control portion 220 reads out the print job from the box 270, and executes the print job (S61 and S58). If there is no print job saved to the box 270 (No in S54), and if the user gives a command to execute a print job corresponding to the user himself/herself, then the print control portion 220 requests the pull printing server 6 to transfer the print job (S55). The print control portion 220, then, receives the print job transferred from the pull printing server 6 in response to the request, and executes the print job (S56, S57, and S58). If communication can be performed with the pull printing server 6 at a time when the execution of the print job, pulled from the pull printing server 6 or the box 270, was finished (Yes in S59), then the print control portion 220 transmits a print completion notice to the pull printing server 6 (S60).

FIG. 10 is a diagram showing an example of the details of port information DP. The port information DP contains a port table T1 and updated history data D2. The port table T1 indicates addresses of image forming apparatuses registered in the pull printing server 6. Referring to the port table T1, device names and IP addresses are registered therein so as to correspond to the order of four image forming apparatuses ranging from the image forming apparatus ranked first through the image forming apparatus ranked fourth. The four image forming apparatuses are named "MFP-1", "MFP-2", "MFP-3", and "MFP-4". Two out of the four image forming apparatuses correspond to the image forming apparatuses 2a and 2b shown in FIG. 1. The remaining two image forming apparatuses are not shown in the drawings. Referring to the port table T1 of FIG. 10, the registration order of the image forming apparatuses is deemed as the order thereof without any change. The updated history data D2 indicates an image forming apparatus 2 that was used the last time for pull printing by a user of an information device 5 to receive the port information DP from the pull printing server 6 among users registered in the pull printing system 1, and the date of the use of the image forming apparatus 2.

Figure 11:
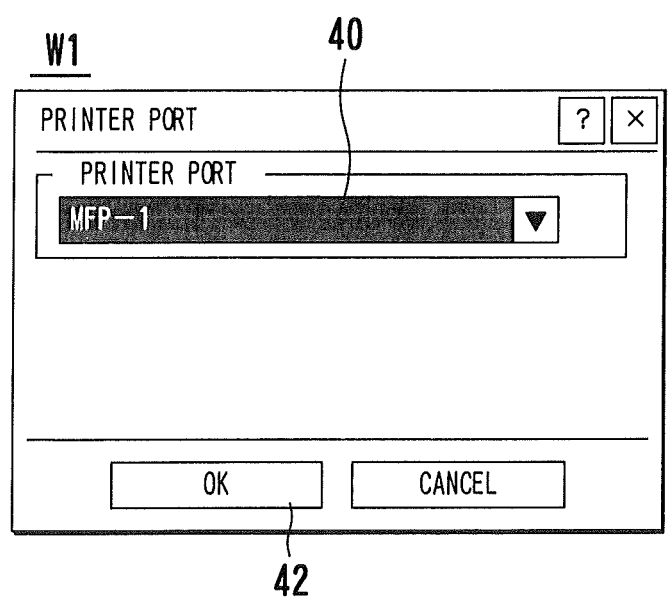
FIG. 11 is a diagram showing an example of the structure of a printer port setting window displayed in an information device.

FIG. 11 is a diagram showing an example of a printer port setting window W1 displayed in the information device 5. When a user gives a command to perform printing during the pull printing server halt state, the printer port setting window W1 is displayed on the display of the information device 5 as a pop-up window. A textbox 40 of the printer port setting window W1 shows the name of an image forming apparatus to which the printer port is switched from the pull printing server 6. Hereinafter, such an image forming apparatus is referred to as a "switching-to-apparatus". A switching-to-apparatus initially displayed in the textbox 40 is automatically determined based on the current port information DP. In the illustrated example, the image forming apparatus named "MFP-1" is set as the switching-to-apparatus. When a user of the information device 5 operates a mouse to click an OK button 42, for example, the printer port is changed to an image forming apparatus displayed in the text box 40 at that time point.

FIG. 12 is a diagram showing an example of the details of the history table T2 provided in the pull printing server 6. The history table T2 contains, as data details, "user name", "job name", "date", "start time", "end time", and "device name". A print job execution history is managed for each user. The illustrated history table T2 shows a print job execution history of print jobs created in accordance with commands given by a user having a user name of "Suzuki". The history table 2 shown in FIG. 12 stores, for fourteen print jobs, the date and time at which each print job is executed, and an image forming apparatus by means of which each print job is executed.

FIG. 13 shows the details of port information DPa corresponding to the details of the history table T2 of FIG. 12. The comparison between FIG. 10 and FIG. 13 shows that the order of the four image forming apparatuses is different between the port table T1 and the port table T1a. The port table T1a of FIG. 13 is created in response to the execution of the fourteenth print job in the history table T2, i.e., "Job-14". In the port table T1a, the four image forming apparatuses are listed in order from the image forming apparatus most frequently used by the user to the image forming apparatus less frequently used. The top device is the image forming apparatus named "MFP-2" having the highest number of uses "9", while the bottom device is the image forming apparatus named "MFP-4" having the lowest number of uses "0".

Figure 14:
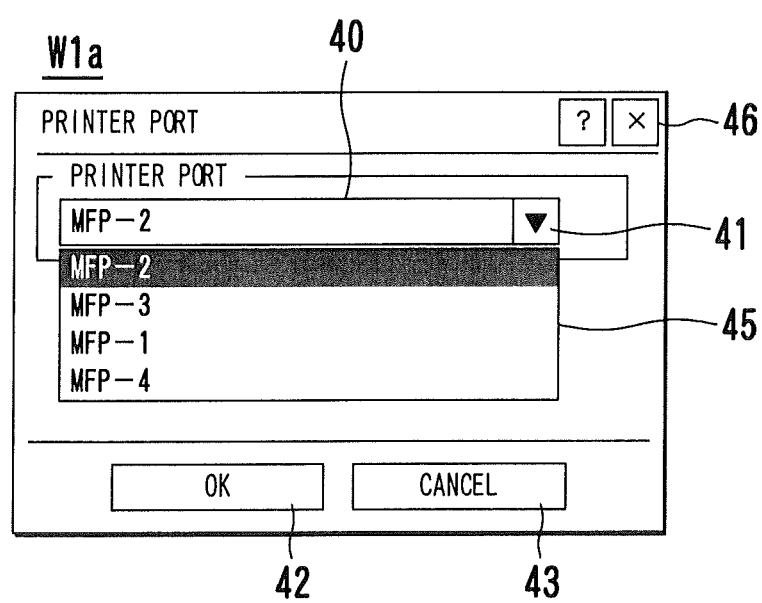
FIG. 14 is a diagram showing the first example of indication of options made in a printer port setting window.

The display made on a printer port setting window W1a of FIG. 14 corresponds to the port information DPa of FIG. 13. When a drop-down button 41 is clicked on, a drop-down list 45 showing options for switching-to-apparatus is displayed below the textbox 40. In the drop-down list 45, options for switching-to-apparatus are listed vertically in order from the top device to the bottom device, and the option currently selected is highlighted.

The order of options displayed in the printer port setting window W1a is determined by the printer driver 510 based on the port table T1 and the updated history data D2. If the date of the last use (Jul., 18, 2010 in the illustrated example) indicated in the updated history data D2a is the same as the date at which the printer port setting window W1a is displayed (the date at which a user gave a command to perform printing), then the device used the last time (MFP-2 in the illustrated example) is specified as the top device, and the device ranked second and devices therebelow are determined based on the order indicated in the port table T1. On the other hand, if the date of the last use indicated in the updated history data D2a is different from the date at which the printer port setting window W1a is displayed, then the order indicated in the port table T1a is determined to be the same as the order of options displayed in the printer port setting window W1a. Referring to the example of FIG. 14, the order of options indicated in the drop-down list 45 is the same as the order indicated in the port table T1a of FIG. 13. In short, in the illustrated example, the printer port setting window W1a of FIG. 14 is displayed on the day after the date of the last use and beyond.

A user clicks the name of a desired device shown in the drop-down list 45, so that he/she can specify a switching-to-apparatus to which the printer port is changed from the pull printing server 6. Referring to the example of FIG. 14, when the user clicks "MFP-3" rather than "MFP-2" that is currently specified as the switching-to-apparatus, "MFP-3" is highlighted instead of "MFP-2", and "MFP-3" is displayed in the text box 40 instead of "MFP-2". When the user clicks the OK button 42 with "MFP-3" highlighted and displayed in the text box 40, "MFP-3" is designated as the switching-to-apparatus to which the printer port is changed, i.e., as the transmission destination of a print job. When the user clicks a cancel button 43, the designation by the user is cancelled, and "MFP-2", which was automatically selected at a time when the printer port setting window W1a was displayed, is specified as the switching-to-apparatus to which the printer port is changed. The display made on the printer port setting window W1a is finished when the user clicks the OK button 42, the cancel button 43, or the close button 46.

Referring to FIG. 15, a history table T2b contains, for fifteen print jobs, records of the date and time at which each print job is executed and an image forming apparatus by means of which each print job is executed. The comparison between FIG. 12 and FIG. 15 shows that the details of the history table T2b of FIG. 15 correspond to the combination of the details of the history table T2 of FIG. 12 and the fifteenth print job history of FIG. 15.

FIG. 16 shows the details of port information DPb corresponding to the details of the history table T2b of FIG. 15. The details of the port table T1b of FIG. 16 are the same as those of the port table T1a of FIG. 13. This is because the order of the number of uses of the four image forming apparatuses remains unchanged although the image forming apparatus as "MFP-4" is used once as shown in the fifteenth record of FIG. 15. Referring to updated history data D2b of FIG. 16, a device used the last time is "MFP-4" and the date of the last use of "MFP-4" is Jul. 20, 2010, which are different from those of the updated history data D2a of FIG. 13.

Figure 17:
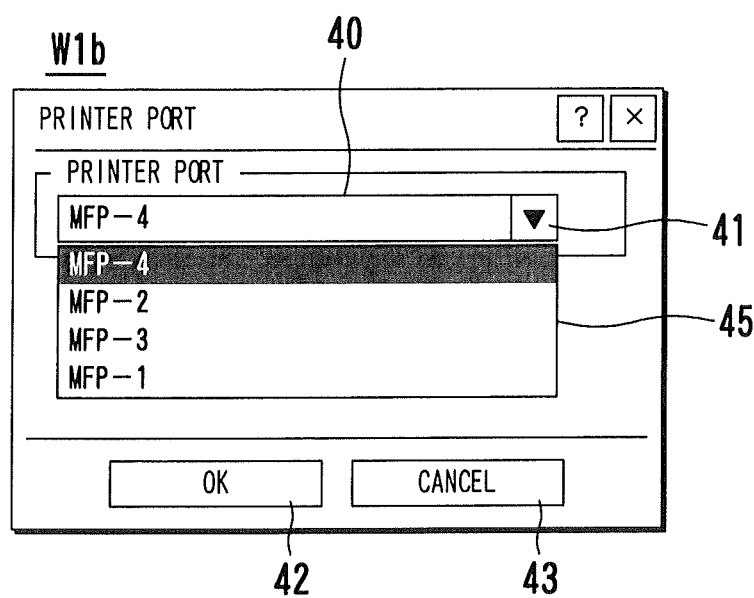
FIG. 17 is a diagram showing the second example of indication of options made in a printer port setting window.

The display made on a printer port setting window W1b of FIG. 17 corresponds to the port information DPb of FIG. 16. In the drop-down list 45 on the printer port setting window W1b, an option for the top device corresponds to the device used the last time indicated in the updated history data D2b of FIG. 16, i.e., "MFP-4", and options for the devices ranked second through fourth correspond to the image forming apparatuses ranked first through third in the port table T1b of FIG. 16, i.e., "MFP-2", "MFP-3", and "MFP-1". In short, in the illustrated example, the printer port setting window W1b of FIG. 17 is displayed on the same date (Jul. 20, 2010 in the illustrated example) as the date of the last use.

In the case where the printer port setting window W1b is displayed on the same date as the date of the last use, a device used the last time is specified as the top device in the printer port setting window W1b. Such an approach is usually based on the empirical rule that, in general, a user uses only one image forming apparatus in one day. Such an approach to determine the order of image forming apparatuses is advantageous over an approach in which the order of image forming apparatuses is always determined based on the number of uses thereof in the past. For example, when a user uses an image forming apparatus once which is installed on a business trip destination and is usually not used by him/her, the image forming apparatus at the business trip destination is automatically selected on that day as the transmission destination of print jobs during the server halt state. This eliminates the need for the user to manually change the transmission destination of print jobs from an image forming apparatus daily used by him/her to the image forming apparatus at the business trip destination.

Figure 18:
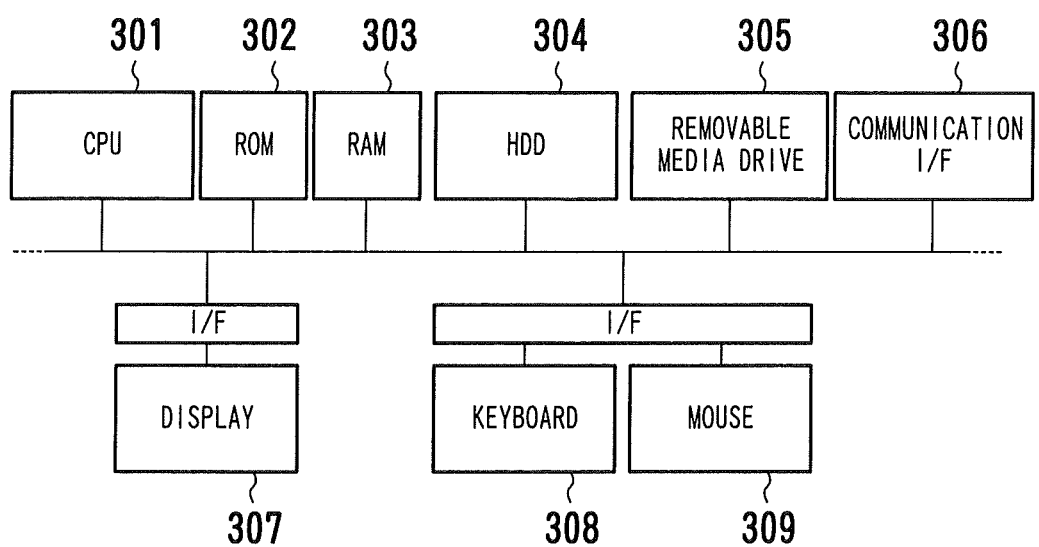
FIG. 18 is a block diagram showing an example of the typical hardware configuration of an information processing apparatus usable as an information device and a pull printing server.

The individual functions of the information device 5 and the pull printing server 6 according to the embodiments discussed above are implemented by using the hardware configuration of an ordinary personal computer shown in FIG. 18. The personal computer is configured of a CPU 301 for executing a variety of programs, a ROM 302 for memorizing a control program, a RAM 303 used as a work area for program execution, a hard disk drive 304 as a storage, and so on. The personal computer is also provided with a removable media drive 305 for accessing to a CD-ROM and a DVD, and a communication interface 306 for connecting to a network. A computer program for implementing the individual functions of the information device 5 and the pull printing server 6 can be installed onto the hard disk drive 304 from a removable storage medium storing the computer program therein, or from an external device connected to the personal computer through a communication interface. The personal computer is also provided with a display 307, a keyboard 308, and a mouse 309 functioning as human interface devices.

Figure 19:
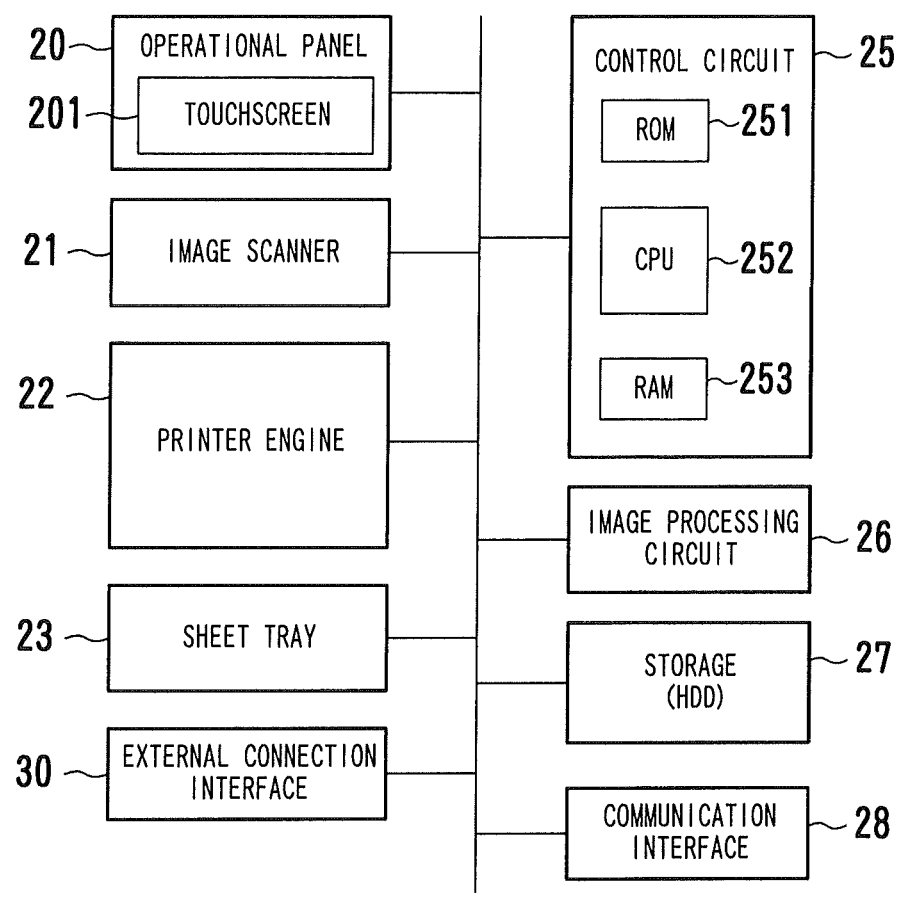
FIG. 19 is a block diagram showing an example of the hardware configuration of an image forming apparatus.

The functions of the image forming apparatus 2 are implemented by using the hardware configuration of the existing MFP shown in FIG. 19. The MFP includes an operational panel 20, an image scanner 21, a printer engine 22, a sheet tray (stacker) 23, a control circuit 25, an image processing circuit 26, a storage 27, a communication interface 28, and an external connection interface 30. The operational panel 20 is provided with a touchscreen 201 through which input by touching operation can be made. The image scanner 21 is capable of optically scanning image information depicted on a document. The printer engine 22 is operable to print a monochrome or color image on a single side or both sides of paper supplied from the multi-stage sheet tray 23. The control circuit 25 is configured of a ROM 251 for storing a control program thereon, a CPU 252 for executing the control program, and a RAM 253 for executing programs. The RAM 253 includes an S-RAM functioning as a work area and an NV-RAM (nonvolatile memory) which stores a variety of settings and is backed up by a battery. The image processing circuit 26 performs a variety of image processing including processing for correcting output data of the image scanner 21 and processing for converting an original image into a bitmap format for printing. The storage 27 is a mass storage device such as a hard disk drive. The storage 27 contains a memory region in which data relating to control of the image forming apparatus 1 is stored, and a memory region in which files of a variety of types of documents are saved, i.e., a so-called box. The communication interface 28 enables the MFP to perform facsimile transmission through a public line. The external connection interface 30 enables the MFP to perform network communication with the information device 5 and the pull printing server 6.

In the embodiments discussed above, the image forming apparatus 2 has a function to save print jobs and execute the saved print jobs in accordance with subsequent operation. Thus, even if the pull printing server 6 stops, a user can cause the image forming apparatus 2 to perform pull printing. Such a pull printing environment is realized by incorporating software into the existing hardware.

In the embodiments above, a transmission destination of a print job under a server halt state is automatically set based on a print job execution history before the server halt state. Thus, even under the server halt state, a user can cause the image forming apparatus 2 to perform pull printing substantially as usual.

According to the embodiments discussed above, when receiving a print completion notice from the image forming apparatus 2, the pull printing server 6 updates the history table T2. Accordingly, it is possible to reflect print job execution circumstances in the history table T2 more accurately than with the case where the history table T2 is updated when the pull printing server 6 transfers a print job to the image forming apparatus 2.

The embodiments discussed above provide, as a method for determining a transmission destination of a print job during a server halt state, a method in which the information device 5 obtains device information indicating print functions of a plurality of image forming apparatuses to determine a transmission destination of a print job depending on the print setting in the print job. For example, if monochrome printing is specified as print settings of a print job, then an image forming apparatus having a function to perform monochrome printing or color printing is specified as the transmission destination of the print job. If color printing is specified as print settings of a print job, then only an image forming apparatus having a function to perform color printing is specified as the transmission destination of the print job.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A pull printing system comprising:
   a plurality of information devices configured to create print jobs individually;
   a pull printing server that stores, therein, at least one of print jobs created by any one of the information devices;
   a plurality of image forming apparatuses configured to acquire, from the pull printing server, a print job stored in the pull printing server and to execute the print job thus acquired, wherein
   the information devices, the pull printing server, and the image forming apparatuses are connected to one another via a network,
   each of the information devices includes
      a port management portion that acquires, from the pull printing server, port information used for communication with the image forming apparatuses, and stores the port information therein, and
      a job transmission portion that, if the pull printing server can perform communication with a subject information device at a time point when the port information is stored and after the time point when the port information is stored, sends a print job created after the time point to the pull printing server, and, if the pull printing server cannot perform communication with the subject information device at the time point and after the time point, sends said print job to any one of the image forming apparatuses based on the port information, and
   the pull printing server includes a port notifying portion that sends the port information to the subject information device.

2. The pull printing system according to claim 1, wherein each of the image forming apparatuses includes a print control portion that provides the pull printing server with information showing that the print job acquired from the pull printing server has been executed, and in response to the information provided by the print control portion, the port notifying portion of the pull printing server sends, as the port information, data indicating an address of the image forming apparatus that has provided the information to the information device corresponding to the print job that has been executed.

3. The pull printing system according to claim 2, wherein each of the image forming apparatuses further includes a job storage portion that stores a print job sent by any one of the information devices.

4. The pull printing system according to claim 2, wherein each of the information devices further includes a user interface that enables a user to perform operation for specifying, as a transmission destination of a print job, any one of the image forming apparatuses indicated in the port information, the pull printing server further includes a job history management portion that keeps a print job execution history, and updates the print job execution history in response to the information provided by the print control portion, and the port notifying portion of the pull printing server determines an order of the image forming apparatuses based on the print job execution history thus updated, and sends, as the port information, data indicating the order thus determined and addresses of the image forming apparatuses.

5. The pull printing system according to claim 4, wherein each of the information devices creates a print job which contains user identification information specifying an operator of the subject information device, the job history management portion of the pull printing server manages the print job execution history for each operator specified in the user identification information, and the port notifying portion of the pull printing server determines an order of the image forming apparatuses based on the print job execution history corresponding to an operator indicated in the user identification information of the print job that has been executed, and sends, as the port information, data indicating the order determined and addresses of the image forming apparatuses.

6. A pull printing system comprising:

an information device that creates a print job;

a pull printing server that stores the print job therein;

an image forming apparatus that executes the print job, wherein the information device, the pull printing server, and the image forming apparatus are connected to one another via a network, the information device includes a port management portion that acquires, from the pull printing server, port information used for communication with the image forming apparatus, and stores the port information therein, and a job transmission portion that, if the pull printing server can perform communication with the information device at a time point when the port information is stored and after the time point when the port information is stored, sends a print job created after the time point to the pull printing server, and, if the pull printing server cannot perform communication with the information device at the time point and after the time point, sends said print job to the image forming apparatus based on the port information, and the pull printing server includes a port notifying portion that sends the port information to the information device.

7. A method for processing a print job in a pull printing system, the pull printing system including a plurality of information devices configured to create print jobs individually, a pull printing server that stores, therein, at least one of print jobs created by any one of the information devices, and a plurality of image forming apparatuses configured to acquire, from the pull printing server, a print job stored in the pull printing server and to execute the print job thus acquired, the information devices, the pull printing server, and the image forming apparatuses being connected to one another via a network, the method comprising:

a step of acquiring, by any one of the information devices, port information used for communication with the image forming apparatuses from the pull printing server, and storing the port information;

a step of creating, by said any one of the information devices, a print job to be sent;

a step of checking, by said any one of the information devices, whether or not the pull printing server can perform communication with said any one of the information devices; and a step of sending, by said any one of the information devices, the print job to be sent to the pull printing server if the pull printing server can perform communication with said any one of the information devices, and sending, by said any one of the information devices, the print job to be sent to any one of the image forming apparatuses based on the port information if the pull printing server cannot perform communication with said any one of the information devices.

8. The method according to claim 7, further comprising a step of providing, by an image forming apparatus of the image forming apparatuses that has acquired a print job from the pull printing server, the pull printing server with information showing that the print job acquired has been executed, and in response to the information provided by any one of the image forming apparatuses, a step of sending, by the pull printing server, as the port information, data indicating an address of the image forming apparatus that has provided the information, to the information device corresponding to the print job that has been executed.

9. The method according to claim 8, further comprising a step of updating, by the pull printing server, a print job execution history in response to the information provided by any one of the image forming apparatuses, wherein the step of sending the port information, by the pull printing server, includes determining an order of the image forming apparatuses based on the print job execution history thus updated, and sending, as the port information, data indicating the order thus determined and addresses of the image forming apparatuses, and the information device that has checked whether or not the pull printing server can perform communication determines, as a high-priority transmission destination of the print job to be sent, an image forming apparatus specified as a high order image forming apparatus in the port information.

10. A non-transitory computer-readable storage medium storing thereon a computer program used in an information device for creating a print job to be executed by any one of a plurality of image forming apparatuses, when executed by a computer provided in the information device, the computer program causing the computer to implement:

a port management portion that acquires port information used for communication with the image forming apparatuses from a pull printing server for transferring the print job or other print jobs to any one of the image forming apparatuses, and stores the port information therein; and a job transmission portion that, if the pull printing server can perform communication with the information device at a time point when the port information is stored and after the time point when the port information is stored, sends a print job created after the time point to the pull printing server, and, if the pull printing server cannot perform communication with the information device at the time point and after the time point, sends said print job to any one of the image forming apparatuses based on the port information.

11. The non-transitory computer-readable storage medium according to claim 10, wherein the computer program further causes the computer to implement a user interface that enables a user to perform operation for specifying, as a transmission destination of a print job, any one of the image forming apparatuses indicated in the port information.

* * * * *